Patented Oct. 14, 1930

1,778,688

UNITED STATES PATENT OFFICE

OTTO REYNARD, OF CHELSEA, LONDON, ENGLAND

PROCESS OF OBTAINING FROM SEAWEED A STABLE FORM OF ALGINIC ACID AND ITS COMPOUNDS

No Drawing.   Application filed May 3, 1928. Serial No. 274,969.

This invention relates to an improved process of obtaining from seaweed a stable form of alginic acid and its compounds.

The object of the present invention is to extract from seaweed the maximum amount of alginic acid, of the highest degree of purity, and/or of metallic alginates, whose solutions possess the highest possible degree of viscosity, by a standardized method which enables these results to be uniformly and consistently obtained.

According to this invention the seaweed to be treated is first thoroughly leached with water so as to ensure rapid subsequent extraction. The leached seaweed is then boiled for not more than 1 hour with an alkaline solution consisting preferably of sodium carbonate dissolved in water, the preferred proportions of this alkaline solution being as follows:—

Sodium carbonate between two to five per cent of the weight of raw seaweed used (before leaching). Water about one-and-a-half times the weight of raw seaweed used.

After boiling the leached seaweed in this solution the pulp thereby obtained is passed through a centrifugal mill containing a rotor rotating at high speed, and fitted with fine screens, so that any gelatinous masses remaining in the pulp are reduced to such a small size that the particles no longer entrap alginate solution and readily give it all up on dilution.

The ground pulp is then diluted with enough hot water to form a diluted pulp weighing from eight to ten times as much as the weight of raw seaweed originally taken.

The soluble part of the diluted pulp, which will generally contain from three to five tenths of one per cent of alkali-metal alginate, must be entirely separated from the insoluble part as rapidly as possible and in such a way that whatever method of separation be adopted, the last portion of diluted pulp has been so separated within four hours of the start of the alkaline treatment.

An insoluble alginate, preferably calcium alginate, is next precipitated out of the clear alginate solution, by running the latter as fast as it comes through the pulp separators through a cooling device into a precipitant, preferably a concentrated solution of calcium chloride.

The quantity of calcium chloride should be fifty per cent in excess of the amount which is theoretically equivalent to the weight of alkali-metal carbonate used in the extraction process, and precipitation can take place in a tank fitted with high speed beaters. Calcium alginate is thereby precipitated in a fibrous and/or granular form which can be rapidly withdrawn, washed and dehydrated by centrifuging until it contains about twenty per cent of alginic acid calculated as the alginic acid radical.

The centrifuged product is placed between layers of absorbent fibrous material and subjected to high pressure in a hydraulic press whereby thin, mechanically strong films are obtained which in a current of hot air can be dried until they retain not more than half of one per cent of moisture, in which form they are permanently stable.

A solution of pure sodium or potassium alginate, containing calcium carbonate in suspension, can be obtained from the dry film of calcium alginate before described by treating it with water and the equivalent quantity of sodium or potassium carbonate, and if sufficient water is used to obtain a solution containing from two to five per cent of alginic acid (in the form of sodium or potassium alginate), a highly viscous solution is obtained which will keep indefinitely without loss of viscosity or decomposition in any form.

Pure alginic acid is prepared by immersing films above described in concentrated hydrochloric acid for the time requisite to effect double decomposition. The film of alginic acid is washed in running water until the washings are free from chlorides and dried, first in a vacuum oven and finally in a current of dry air at sixty degrees Centigrade until it contains not more than half of one per cent of moisture.

Sodium, potassium, ammonium or other alginate is prepared from the pure alginic acid films by known methods, precautions being taken to keep stock solutions, which may be kept for any length of time before evaporation, between a concentration of between two and five per cent of alginic acid and drying the finally obtained solid alginates until they retain not more than half of one per cent of moisture.

I claim:—

1. A process of obtaining from seaweed a stable form of alginic acid, which consists in thoroughly leaching the seaweed, boiling it with an alkaline solution for not more than one hour, grinding the pulp so obtained in a centrifugal mill, passing it through fine screens, diluting it with hot water to a weight from eight to ten times that of the raw seaweed, completely separating the liquid from the insoluble material within four hours from the start of the alkaline treatment, running the liquid so obtained through a cooling device into a precipitant, separating and washing the precipitate of insoluble alginate and washing and compressing it into thin films and then drying the films until they contain not more than half of one per cent of moisture.

2. A process of obtaining from seaweed a stable form of alginic acid, which consists in thoroughly leaching the seaweed, boiling it with an alkaline solution for not more than one hour, grinding the pulp so obtained in a centrifugal mill, passing it through fine screens, diluting it with hot water to a weight from eight to ten times that of the raw seaweed, completely separating the liquid from the insoluble material within four hours from the start of the alkaline treatment, running the liquid so obtained through a cooling device into a precipitant, separating and washing the precipitate of insoluble alginate and washing and compressing it into thin films, immersing the films in concentrated hydrochloric acid until double decomposition has been completed, washing the films and drying them until they contain not more than half of one per cent of moisture.

In testimony whereof I have hereunto set my hand this 23rd day of April, 1928.

OTTO REYNARD.